United States Patent
Tomita et al.

(10) Patent No.: US 7,315,416 B2
(45) Date of Patent: Jan. 1, 2008

(54) SCREEN UNIT AND PROJECTION TYPE DISPLAY APPARATUS

(75) Inventors: Sadakazu Tomita, Tokyo (JP); Kouhei Teramoto, Tokyo (JP); Teruo Miyamoto, Tokyo (JP); Kimihide Nakatsu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 235 days.

(21) Appl. No.: 11/124,118

(22) Filed: May 9, 2005

(65) Prior Publication Data

US 2005/0248842 A1 Nov. 10, 2005

(30) Foreign Application Priority Data

May 10, 2004 (JP) .............................. 2004-139852

(51) Int. Cl.
*G03B 21/56* (2006.01)

(52) U.S. Cl. ....................... 359/443; 359/460; 359/896
(58) Field of Classification Search ................ 359/443, 359/460, 896, 455, 456, 457, 449, 451
See application file for complete search history.

(56) References Cited

U.S. PATENT DOCUMENTS

| 2004/0201887 A1* | 10/2004 | Takano ........................ 359/460 |
| 2005/0185270 A1* | 8/2005 | Engle .......................... 359/443 |
| 2006/0126172 A1* | 6/2006 | Iwaki et al. ................. 359/457 |

FOREIGN PATENT DOCUMENTS

| JP | 6-194740 A | 7/1994 |
| JP | 8-314015 A | 11/1996 |
| JP | 2001-154274 A | 6/2001 |
| JP | 2001-356419 A | 12/2001 |

* cited by examiner

Primary Examiner—Diane Lee
Assistant Examiner—Robert Do
(74) Attorney, Agent, or Firm—Birch, Stewart, Kolasch & Birch, LLP

(57) ABSTRACT

A screen panel includes a rigid glass, a lenticular lens and a Fresnel lens laminated with each other, and the edges of the screen panel are sealed. An air evacuation path is formed between the lenses by wires inserted between the contact surfaces of the lenses, or by convexes or concaves previously formed on one of the contact surfaces. Because of the provision of the air evacuation path, the air between the lenses of the screen panel is sufficiently evacuated, and the lenses can closely attached to each other. Therefore, the flatness of the screen panel can be enhanced, and the degradation of the image quality can be prevented.

11 Claims, 6 Drawing Sheets

SCREEN UNIT AND PROJECTION TYPE DISPLAY APPARATUS

BACKGROUND OF THE INVENTION

This invention relates to a transmission type screen unit that displays an image while maintaining a flatness, and a projection type display apparatus using the screen unit.

Recently, a projection type display apparatus is broadly used as a large-sized display device for displaying an image information. The projection type display apparatus is constructed to project an image on a transmission type screen, and the size of the projection type display apparatus tends to be large. As the transmission type screen, the projection type display apparatus employs a screen (hereinafter referred to as a screen panel) including a plurality of sheet shaped lenses (hereinafter, referred to as lens sheets) such as a Fresnel lens and a lenticular lens laminated with a glass plate.

In the above constructed screen panel, the image quality is maintained by keeping the incident angle of the incident light on the screen panel to a designed angle, and therefore it is important to maintain the flatness of the screen panel. Further, in order to ensure the focusing performance, it is necessary that the laminated lens sheets are attached to each other as closely as possible. Therefore, the screen panel is so constructed that the flatness of the screen panel is maintained and the laminated lens sheets are closely attached to each other.

However, the sheet shaped Fresnel lens and the lenticular lens used in the screen panel are made of resin material having the thickness of several millimeters, in order to reduce the weight of the apparatus and to ensure the optical transmission. Therefore, the lens sheets may expand, contract or become warped according to the surrounding condition (i.e., temperature or humidity) or an externally applied stress, with the result that the image quality may be degraded. In order to prevent the problem, it is proposed to previously warp the lens sheets before the lens sheets are closely attached to each other (for example, Patent document 1). Further, it is proposed to closely attach the lens sheets to the glass plate having a rigidity (for example, Patent Document 2).

However, according to the upsizing of the screen unit, the areas of the lens sheets tend to be large, and therefore it becomes difficult to sufficiently restrict the expansion, contraction or warping of the lens sheets, even if the lens sheets are closely attached to the rigid glass plate or the like. Moreover, if the expansion, contraction and warping of the lens sheets are to be restricted by increasing the thickness of the lens sheets, the cost may increase. Further, there is a difference in hygroscopic property between a surface of the lens sheets contacting the glass plate and the opposite surface of the lens sheets exposed to the outside air, and therefore the separation of contact surfaces of the lens sheets may occur, so that the lens sheets may be warped.

In order to solve these problem, it is proposed to evacuate the air between the laminated lens sheets to reduce the pressure to be lower than the atmospheric pressure so that the lens sheets are closely attached to each other (for example, Patent Documents 3 and 4).

[Patent Document 1]
Japanese Laid-open Patent Publication No. 2001-356419 (see FIG. 1)

[Patent Document 2]
Japanese Laid-open Patent Publication No. 2001-154274 (see FIG. 3)

[Patent Document 3]
Japanese Laid-open Patent Publication No. 06-194740 (see FIG. 1)

[Patent Document 4]
Japanese Laid-open Patent Publication No. 08-314015 (see FIG. 2)

However, in the method in which the air between the lens sheets is evacuated while the screen is manufactured (Patent Document 3), the air may flow into between the lens sheets because of minute imperfections of the sealing member or the deterioration of the sealing member with age. Further, in the method in which the air between the lens sheets is evacuated while the screen is used (Patent Document 4), the air may not be sufficiently evacuated throughout the whole surfaces of the lens sheets if the lens sheets become large. Particularly, in a part far from the evacuating portion (such as an evacuating fan), the pressure between the lens sheets are not sufficiently reduced, and therefore the flatness of the screen panel may not be maintained. In addition, the lens sheets may be warped because of the humidity, so that the image quality may be degraded.

SUMMARY OF THE INVENTION

An object of the present invention is to provide a screen unit capable of uniformly evacuating the air between lens sheets or the like of a screen panel, to thereby reduce the pressure between the lens sheets or the like to be lower than the atmospheric pressure so that the lens sheets are closely attached to each other, with the result that the flatness of the screen panel can be maintained and the degradation of the image quality can be prevented even when the surrounding condition (such as temperature and humidity) changes.

Another object of the present invention is to provide a projection type display apparatus using the above described screen unit.

The present invention provides a screen unit including a frame body having an opening for displaying an image, and a screen panel including a plurality of laminated optically-transmissive plate members. The screen panel is fixed to the frame body so that a light incident on the screen panel is emitted through the opening. The screen unit further includes a sealing portion that seals edges of the screen panel, an air evacuation path providing portion that provides an air evacuation path between any of the plurality of plate members, a vent hole that leads to the air evacuation path, and an evacuating portion that evacuates the air between the plurality of the plate members through the vent hole.

With such a screen unit, contact surfaces of the lens sheets or the like of the screen panel can be closely attached to each other, and therefore the flatness of the screen panel can be maintained and the degradation of the image quality can be prevented, even when the surrounding condition (such as temperature and humidity) changes.

DESCRIPTION OF THE PREFERRED EMBODIMENT

Embodiment 1

Figure 1:
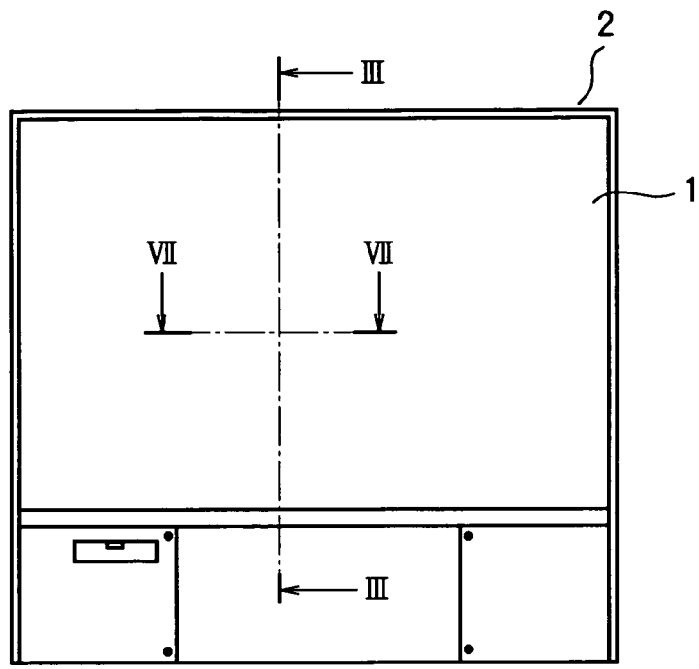
FIG. 1 is a front view of a projection type display apparatus 2 according to Embodiment 1 of the present invention.
Figure 2:
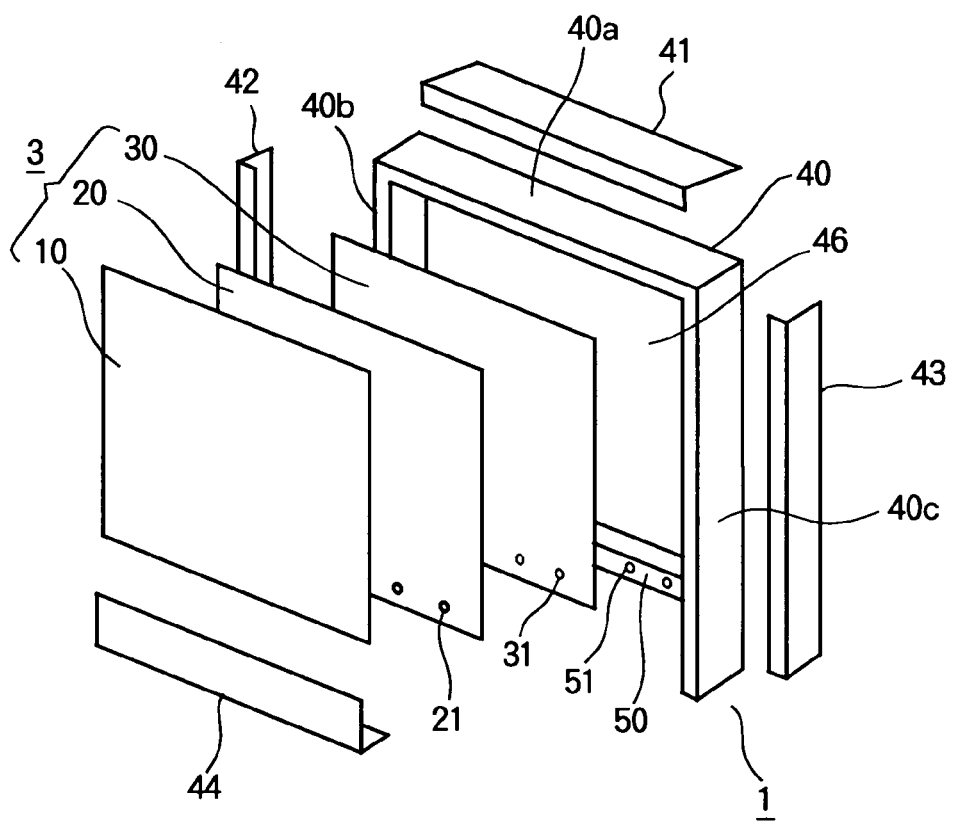
FIG. 2 is an exploded perspective view of a screen unit 1 according to Embodiment 1 of the present invention.
Figure 3:
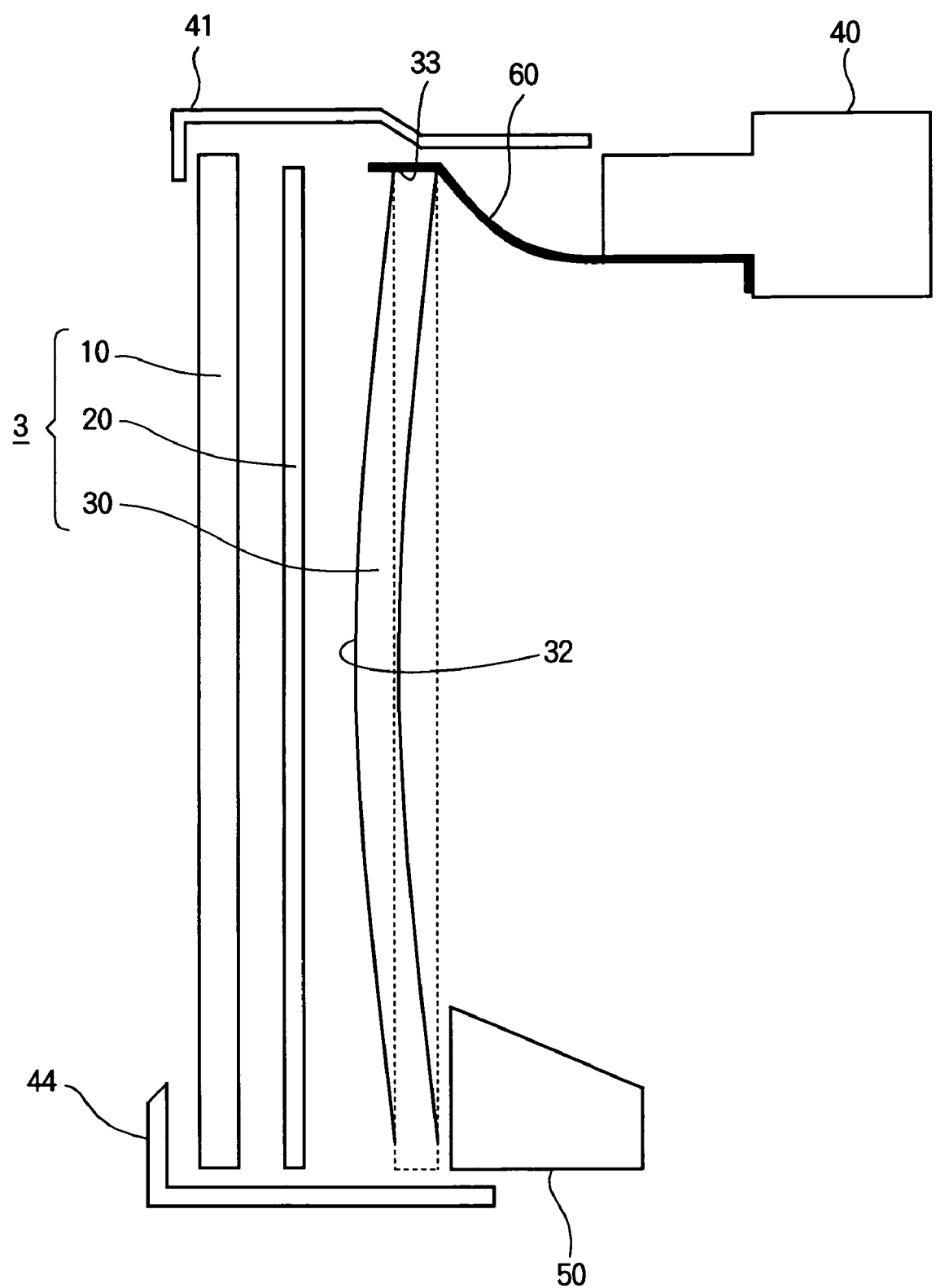
FIG. 3 is a cross sectional view of a part of the screen unit 1 according to Embodiment 1 of the present invention.

FIG. 1 is a front view of a projection type display apparatus 2 having a screen unit 1 according to Embodiment 1 of the present invention. FIG. 2 is an exploded perspective view of a screen unit 1 in a state where the screen unit 1 is being assembled. As shown in FIG. 2, a screen panel 3 is constituted by laminating a glass plate 10, a lenticular lens 20 and a Fresnel lens 30. The glass plate 10, the lenticular lens 20 and the Fresnel lens 30 are optically-transmissive plate members. The lenticular lens 20 and the Fresnel lens 30 are collectively called as lens sheets. The screen panel 3 fits in an opening 46 of a screen frame 40 (i.e., a frame body). The opening 46 of the screen frame 40 is provided for displaying an image. The screen frame 40 is constructed to include two vertically extending side portions 40b and 40c whose tops are connected by a horizontally extending upper portion 40a. A connecting frame 50 horizontally extend between the lower parts of the side portions 40b and 40c of the screen frame 40. A lower glass holding plate 44 is fixed to the connecting frame 50, an upper glass holding plate 41 is fixed to the upper portion 40a of the screen frame 40, side glass holding plates 42 and 43 are fixed to the side portions 40b and 40c of the screen frame 40, and a shielding plate 60 (i.e., a holding member: FIG. 3) bonded to the Fresnel lens 30 is fixed to the upper portion 40a and the side portions 40b and 40c, so that the screen panel 3 is attached to the screen frame 40 as described later.

Figure 7:
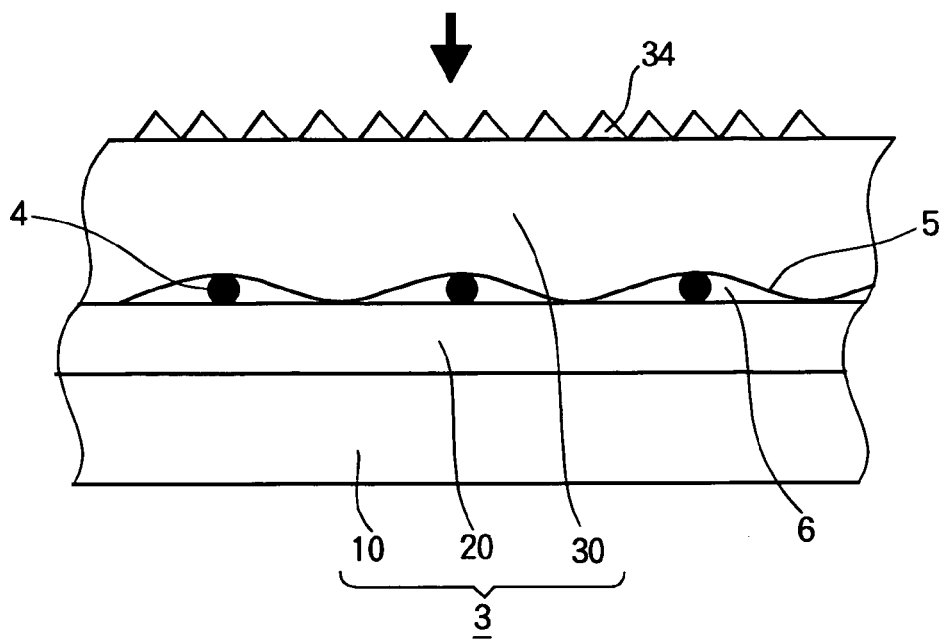
FIG. 7 is a sectional view of an air evacuation path providing portion according to Embodiment 1 of the present invention.

A plurality of fine wires (i.e., a spacer: FIG. 7) are inserted between the lenticular lens 20 and the Fresnel lens 30 in the vertical direction in such a manner that constant intervals are formed between the wires, so that air evacuation path is provided. The edges of the screen panel 3 are sealed by a not shown sealing portion. Vent holes 21 and 31 are formed on the lenticular lens 20 and the Fresnel lens 30. The vent holes 21 and 31 are substantially aligned with each other, and located close to the center of the lens sheet with respect to the sealing portion. The vent holes 21 and 31 lead to the air evacuation path between the lens sheets. The connecting frame 50 is constructed to have a hollow air reservoir for reducing the pressure loss when the air is evacuated. The connecting frame 50 has a vent hole 51 on a side contacting the Fresnel lens, and the vent hole 51 leads to the air evacuation path. The air reservoir of the connecting frame 50 leads to a not shown evacuating portion. When the evacuating portion operates, the air is evacuated from between contact surfaces of the lens sheets of the screen panel 3 through the vent holes 21, 31 and 51.

The structure of the screen panel 3 and the fixing method of the screen panel 3 will be described with reference to FIG. 3. FIG. 3 is a cross sectional view taken along a line III-III shown in FIG. 1. The screen panel 3 is constructed by the glass plate 10, the lenticular lens 20 and the Fresnel lens 30. The Fresnel lens 30 is previously warped so that a surface 32 of the Fresnel lens 30 in contact with the lenticular lens 20 becomes a convex surface. The upper edge 33 and two side edges (not shown) of the Fresnel lens 30 are bonded to the shielding plate 60 by means of adhesive agent. The shielding plate 60 is fixed to the upper portion 40a and the side portions 40b and 40c of the screen frame 40 by means of bolts or the like, in a state where the upper edge 33 and the side edges of the Fresnel lens 30 are bonded to the shielding plate 60. The shielding plate 60 has a function to fix the Fresnel lens 30 to the screen frame 40, as well as the function to shield the light.

In this state, the lenticular lens 20 is sandwiched between the glass plate 10 and the Fresnel lens 30, and the glass plate 10 is urged against the Fresnel lens 30 (from the left in FIG. 3) by the upper glass holding plate 41, the side grass holding plates 42 and 43 and the lower glass holding plate 44. The upper glass holding plate 41 and the side grass holding plates 42 and 43 are fixed to the screen frame 40 by means of bolts or the like, and the lower glass holding plate 44 is fixed to the connecting frame 50 by means of bolts or the like. The Fresnel lens 30 is held by the shielding plate 60 and the connecting frame 50 so that the Fresnel lens 30 does not move, and the rigidity of the flat surface of the glass plate 10 is sufficiently greater than the rigidity of the convex surface 32 of the Fresnel lens 30. As a result, the Fresnel lens 30 becomes flat as indicated by a dashed line in FIG. 3, and is pressed against the lenticular lens 20.

Figure 4:
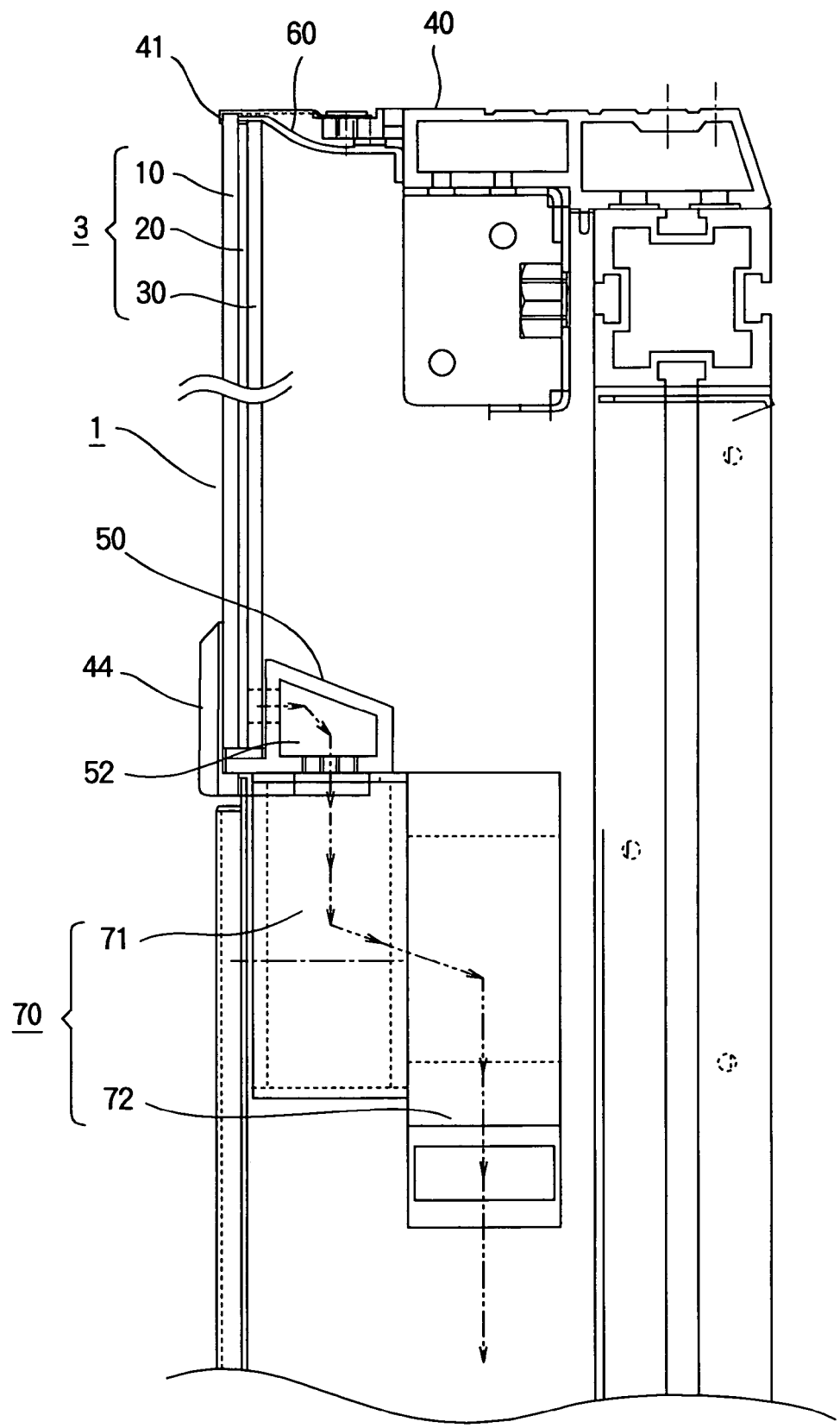
FIG. 4 is a sectional view of the assembled screen unit 1 according to Embodiment 1 of the present invention.

FIG. 4 is a sectional view of the assembled screen unit 1. As shown in FIG. 4, the shielding plate 60 (that holds the Fresnel lens 30) is fixed to the screen frame 40. The screen panel 3 including the glass plate 10, the lenticular lens 20 and the Fresnel lens 30 is sandwiched by the upper glass holding plate 41, the side glass holding plates 42 and 43 and the lower glass holding plate 44 from the left in FIG. 4, and by the shielding plate 60 (at the upper edge and the side edges) and the connecting frame 50 (at the lower edge) from the right in FIG. 4. The evacuating portion 70 evacuates the air through the air reservoir 52 of the connecting frame 50, so as to reduce the pressure of the air between the lens sheets or the like of the screen panel 3 to be lower than the atmospheric pressure, to thereby closely attach the contact surfaces.

Figure 5:
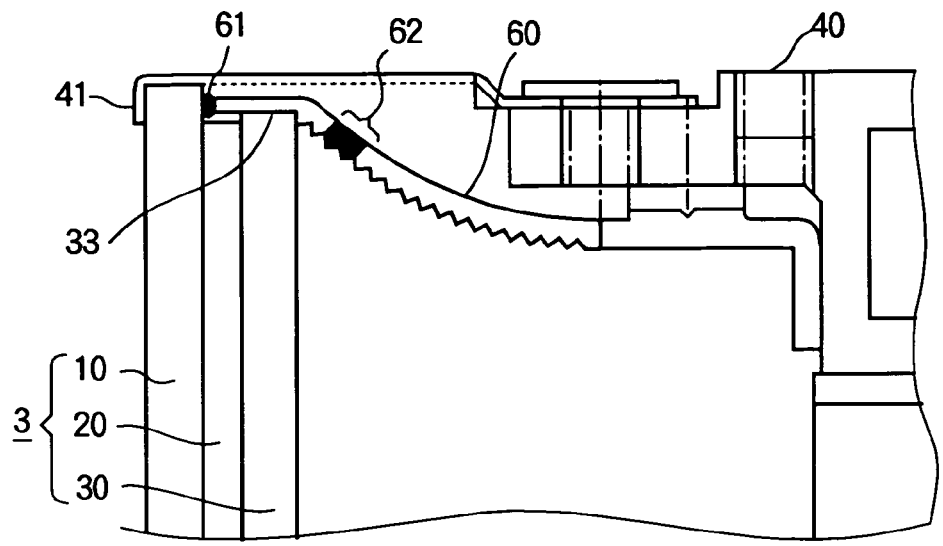
FIG. 5 is a cross sectional view of an upper part of the screen unit 1 according to Embodiment 1 of the present invention.

The sealing portion for sealing the edges of the screen panel 3 will be described with reference to FIGS. 5 and 6. FIG. 5 is a sectional view of an upper part of the screen panel 3. The shielding plate 60 by which the Fresnel lens 30 is held by bonding is fixed to the screen frame 40. A main body of the shielding plate 60 is made of ABS (acrylonitrile-butadiene-styrene) resin. A tip 61, a bonding portion (bonded to the Fresnel lens 30) and an intermediate portion 62 (between the bonding portion and the screen frame 40) are made of elastomer resin capable of resiliently stretching and shrinking. The main body, the tip 61, the bonding portion and the intermediate portion 62 are integrally formed by means of a method generally called as a double molding method. The double molding method is broadly used, and therefore the explanation thereof is omitted.

The dimensions of the glass plate 10 in the upward direction and in the left and right directions are slightly larger than those of the Fresnel lens 30. The dimensions of the lenticular lens 20 in the upward direction and in the left and right directions are smaller than or equals to those of the Fresnel lens 30. The tip 61 of the shielding plate 60 has the length longer than the thickness of the laminated Fresnel lens 30 and the lenticular lens 20. With such an arrangement, when the glass plate 10 is fixed to the screen frame 40 by means of the upper glass holding plate 41, the tip 61 of the shielding plate 60 abuts against the glass plate 10 and is compressed, so that the tip 61 closely contacts the glass plate 10.

The bonding portion of the shielding plate 60 and the upper edge 33 of the Fresnel lens 30 has a sealing function to prevent the entry of the air, as well as the function to bond the shielding plate 60 to the Fresnel lens 30. If the Fresnel lens 30 expands or contract according to the change of the surrounding condition such as temperature or humidity, a stress may be applied to the shielding plate 60 in the vertical direction and in the horizontal direction, which may cause the separation of the bonding portion. However, as the intermediate portion 62 is made of resilient elastomer resin, the intermediate portion 62 absorbs the stress that otherwise may be applied to the shielding plate 60, so as to prevent the separation of the bonding portion between the shielding plate 60 and the Fresnel lens 30. The left and right parts of the screen panel 3 have the same structures as the above described structure of the upper part of the screen panel 3. Because of the close contact of the bonding portion, and because of the close contact between the tip 61 of the shielding plate 60 and the glass plate 10, the sealing of the screen panel 3 at the upper edge and the left and right edges is ensured. The outside air is not allowed to enter into the screen panel 3 through the upper edge and the left and right edges of the screen panel 3. In other words, the shielding plate 60 that holds the Fresnel lens 30 also acts as the sealing portion that seals a part (the upper edge and the left and right edges) of the screen panel 3.

Figure 6:
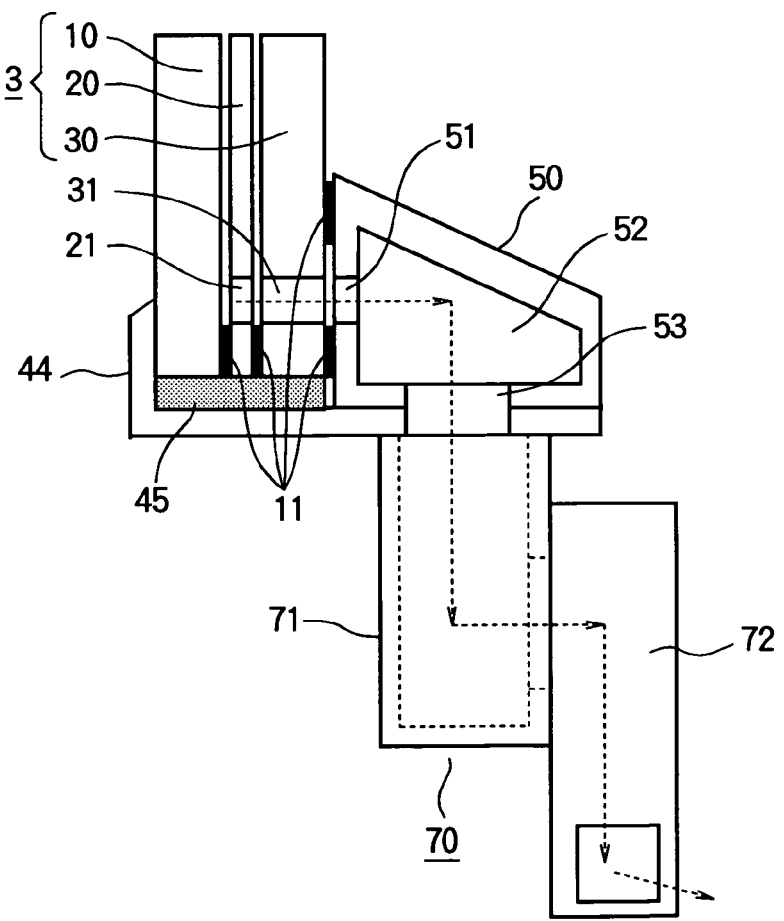
FIG. 6 is a cross sectional view of a lower part of the screen unit 1 according to Embodiment 1 of the present invention.

FIG. 6 is a sectional view of the lower part of the screen panel 3. The lower glass holding plate 44 supports the vertical load of screen panel 3 (including the glass plate 10, the lenticular lens 20 and the Fresnel lens 30) via a cushion 45 interposed therebetween. The lower glass holding plate 44 holds the screen panel 3 so that the screen panel 3 is sandwiched between the lower glass holding plate 44 and the connecting frame 50. A plurality of fine wires (i.e., a spacer: FIG. 7) are inserted into between the lenticular lens 20 and the Fresnel lens 30 in the vertical direction, so that the air evacuation path is provided.

Double coated adhesive tapes 11 are provided between the glass plate 10 and the lenticular lens 20, and between the lenticular lens 20 and the Fresnel lens 30. The double coated adhesive tapes 11 fix the glass plate 10, the lenticular lens 20, the Fresnel lens 30 and the connecting frame 50 to each other. The double coated adhesive tapes 11 also act as a sealing portion that seals the lower edge of the screen panel 3. The double sided adhesive tapes 11, the above described bonding portion between the Fresnel lens 3 and the shielding plate 60, and the contact portion between the tip 61 of the shielding plate 60 and the glass plate 10 constitute a sealing portion that seals the edges of the screen panel 3. The vent holes 21 and 31 are substantially aligned with each other, and located close to the centers of the lens sheets with respect to the double sided adhesive tapes 11. The vent holes 21 and 31 lead to the air evacuation path between the lens sheets.

A hole 53 for a suction duct is provided on the bottom of the connecting frame 50. The hole 53 leads to a suction duct 71 and an evacuating fan 72. The suction duct 71 and the evacuating fan 72 constitute an air evacuating portion 70.

When the evacuating fan 72 operates, the air between the contact surfaces of the glass plate 10, the lenticular lens 20 and the Fresnel lens 30 is evacuated through the vent holes 21, 31 and 51 as shown by arrows in FIG. 6.

The wires as the spacer (i.e., the air evacuation path providing portion) inserted between the lenticular lens 20 and the Fresnel lens 30 will be described with reference to FIG. 7. FIG. 7 is a sectional view of the screen panel 3 taken along line VII-VII shown in FIG. 1. The light is incident on the screen panel 3 from above in FIG. 7, and the projected image is viewed by a viewer from below in FIG. 7. The glass plate 10, the lenticular lens 20, the Fresnel lens 30 are laminated with each other. A lens portion 34 of the Fresnel lens 30 converts the incident light to the parallel light. The wires 4 are inserted between the lenticular lens 20 and the Fresnel lens 30 in the vertical direction (i.e., perpendicular to the paper of FIG. 7) so that predetermined intervals are formed between the wires 4. As the lenticular lens 20 closely contacts the glass plate 10 having rigidity, convexes and concaves 5 are formed on the Fresnel lens 30 by the wires 4. The convexes and concaves 5 form the air evacuation path 6 between the contacting surfaces of the lenticular lens 20 and the Fresnel lens 30.

Next, the operation of the screen unit 1 will be described. When the evacuating fan 72 operates, the air between the contact surfaces of the glass plate 10, the lenticular lens 20 and the Fresnel lens 30 is evacuated through the suction duct 71, the air reservoir 52 of the connecting frame 50, the vent holes 21, 31 and 51 and the air evacuation path 6 formed by the wires 4 between the lenticular lens 20 and the Fresnel lens 30. Because the edges of the screen panel 3 are tightly sealed, and because the air evacuation path 6 between the lenticular lens 20 and the Fresnel lens 30 is formed throughout the whole surfaces of the lens sheets, the evacuation of the air is not prevented throughout the whole surfaces of the lens sheets. Thus, the air can be evacuated throughout the whole surfaces of the lens sheets.

According to Embodiment 1, it becomes possible to reduce the pressure of the contact surfaces of the screen panel 3 to be lower than the atmospheric pressure, and therefore the separation of the contact surfaces of the lens sheets do not occur even when the surrounding condition such as temperature and humidity changes. Therefore, it becomes possible to provide the screen unit capable of maintaining the flatness, and preventing the degradation of the image quality.

An experiment is carried out in order to make sure the advantage of the screen unit 1 according to Embodiment 1, compared with the conventional screen unit having no wires 4. In the experiment, the evacuation test is carried out on the screen unit 1. The condition and the result of the experiment will be described below.

<Samples of the Screen Unit 1>

Figure 8:
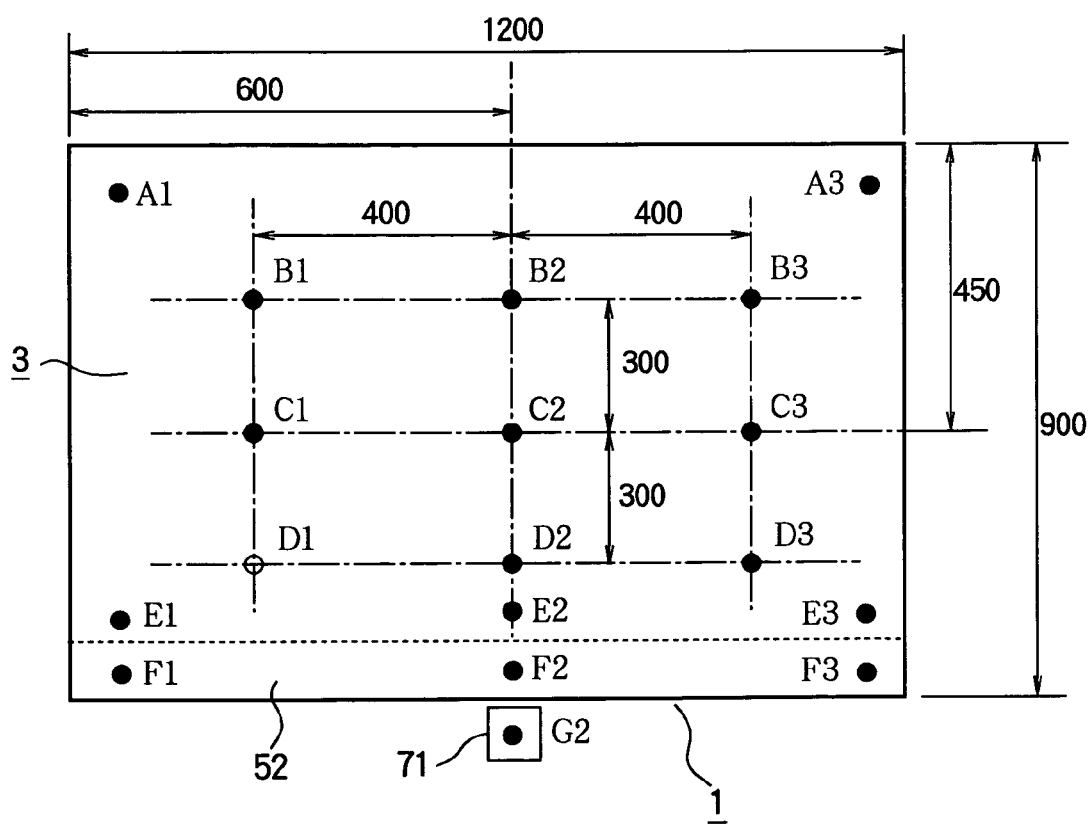
FIG. 8 is a front view of a screen unit 1 for experiment according to Embodiment 1 of the present invention.

FIG. 8 shows the screen unit 1 used in the Embodiment. The vertical dimension of the screen panel 3 is 1200 mm, and the horizontal dimension of the screen panel 3 is 900 mm. Each of the lenticular lens 20 and the Fresnel 30 is made of acryl resin having the thickness of 2 mm. The glass plate 10 has the thickness of 3 mm. As the wires 4, tin-plated ten cupper wires having the diameter of 0.2 mm are inserted between the lenticular lens 20 and the Fresnel lens 30. The intervals between the cupper wires is 120 mm. Other condition is described below.

As the evacuating fan 72, a sirocco fan having the maximum static pressure of 107.9 Pa and the maximum flow rate of 0.32 $m^3$/min. The vent holes 21, 31 and 51 are formed on the lenticular lens 20, the Fresnel lens 30 and the connecting frame 50 with constant intervals. The diameter of each of the vent holes 21, 31 and 51 is 7 mm. For each of the lenticular lens 20, the Fresnel lens 30 and the connecting frame 50, the number of the vent holes is 29.

The thickness of each of the double coated adhesive tapes 11 at the lower parts of the lens sheets is 0.3 mm.

<Experimental Condition>

The same test image patterns are projected in the case 1 where the wires 4 are not provided (i.e., the evacuation path 6 is not formed) and in the case 2 where the wires 4 are provided (i.e., the evacuation path 6 is formed). When a sufficient time has passed after the sirocco fan starts operating, the difference between the pressure at each measurement point from the atmospheric pressure is measured. FIG. 8 shows the measurement points. The measurement points A1, A3 E1 and E3 are distanced from the horizontal edge of the display surface of the screen panel 3 by 50 mm and distanced from the vertical edge of the display surface of the screen panel 3 by 50 mm. The measurement points F1 through F3 are in the air reservoir 52, and the measurement point G2 is in the suction duct 71.

<Experimental Result>

Table 1 shows the experimental result. The value of each measurement point indicates the difference from the atmospheric pressure. In Table 1, the large value indicates that the pressure at the measurement point is low. The "effect" shown in Table 1 indicates the comparative value of the case 2 compared with the case 1. When the comparative value is positive (+), the pressure at the measurement point of the case 2 is lower than that of the case 1. When the value is negative (−), the pressure at the measurement point of the case 2 is higher than that of the case 1.

TABLE 1

| Measurement Point | Case 1 (Having No Wires) | Case 2 (Having Wires) | Effect |
|---|---|---|---|
| A1 | 1.9 | 10.2 | +8.3 |
| A3 | 1.7 | 19.5 | +17.8 |
| B1 | 7.7 | 16.5 | +8.8 |
| B2 | 12.9 | 26.4 | +13.5 |
| B3 | 7.8 | 28.0 | +20.2 |
| C1 | 12.4 | 19.3 | +6.9 |
| C2 | 26.4 | 35.6 | +9.2 |
| C3 | 21.0 | 39.2 | +18.2 |
| D1 | 48.2 | 23.6 | −24.2 |
| D2 | 60.0 | 55.8 | −4.2 |
| D3 | 45.5 | 55.3 | +9.8 |
| E1 | 43.0 | — | — |
| E2 | 68.0 | 65.6 | −2.4 |
| E3 | 60.0 | — | — |
| F1 | 69.4 | — | — |
| F2 | 69.4 | — | — |
| F3 | 71.7 | — | — |
| G2 | 76.0 | 70.9 | −5.1 |

(unit: Pa)

As shown in Table 1, at the upper part of the screen panel (i.e., the measurement points A and B of FIG. 8), the difference of the pressure at each measurement point from the atmospheric pressure is from 1.7 Pa to 12.9 Pa in the case 1 having no wires 4, while the difference of the pressure at each measurement point from the atmospheric pressure is from 10.2 Pa to 28 Pa in the case 2 having the wires 4. Thus, it is understood that the air between the lens sheets of the screen panel is not sufficiently evacuated in the case 1 having no wires 4. Conversely, in the lower part of the screen panel (i.e., the measurement points D and E of FIG. 8), the difference of the pressure at each measurement point from the atmospheric pressure is from 43 Pa to 68 Pa in the case 1 having no wires 4, while the difference of the pressure at each measurement point from the atmospheric pressure is from 23.6 Pa to 65.6 Pa in the case 2 having the wires 4. Thus, it is understood that the pressure at the lower part of the screen panel in the case 1 having no wires 4 is lower than the screen panel in the case 2 having the wires 4. This is because the air is not sufficiently evacuated throughout the surface of the screen panel 3 in the case 1, and the air is strongly evacuated only in the vicinity of the evacuating fan 72 in the case 1 (rather than in the case 2).

Additionally, the difference of the pressure at the center of the lens sheet from the atmospheric pressure is measured, when the lens sheets used in the above described Experiment (whose horizontal dimension is 1200 mm and vertical dimension is 900 mm) starts being warped at the center thereof. The measured difference of the pressure (from the atmospheric pressure) is 10 Pa when the thickness of the lens sheets is 2 mm, and 30 Pa when the thickness of the lens sheets is 3 mm. In the above described Experiment, if the wires 4 are inserted between the lens sheets, the difference of the pressure at the center of the screen panel 3 from the atmospheric pressure is 31.6 Pa. Therefore, the screen panel 3 is not warped by the change of the surrounding condition such as temperature and humidity even when the thickness of the lens sheets is 2 mm or 3 mm.

As described above, the effect of Embodiment 1 is experimentally proved.

Embodiment 2

Figure 9:
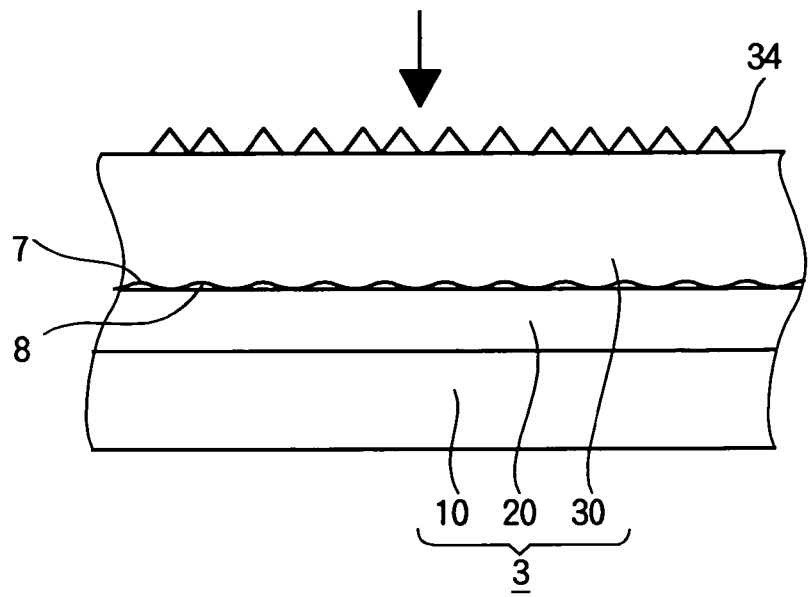
FIG. 9 is a sectional view of an air evacuation path providing portion according to Embodiment 2 of the present invention.

In Embodiment 1, the wires 4 are used as the air evacuation path providing portion. Embodiment 2 provides the air evacuation path without using the wires 4. Embodiment 2 will be described with reference to FIG. 9. FIG. 9 is a sectional view taken along line VII-VII shown in FIG. 1. The light is incident on the screen panel 3 from above in FIG. 9, and the projected image is viewed by a viewer from below in FIG. 9. The glass plate 10, the lenticular lens 20, the Fresnel lens 30 are laminated with each other. A lens portion 34 of the Fresnel lens 30 converts the incident light to the parallel light.

Convexes and concaves 7 are formed on the surface of the Fresnel lens 30 in contact with the lenticular lens 20 so that cavities extending in the vertical direction (i.e., perpendicular to the paper of FIG. 9) are formed. The convexes and concaves 7 form the air evacuation path 8 between the contacting surfaces of the lenticular lens 20 and the Fresnel lens 30. The shape of the evacuation path 8 is the same as that of Embodiment 1.

Next, the operation of the screen unit 1 according to Embodiment 2 will be described. When the evacuating fan 72 operates, the air between the contact surfaces of the glass plate 10, the lenticular lens 20 and the Fresnel lens 30 is evacuated through the suction duct 71, the air reservoir 52 of the connecting frame 50, the vent holes 21, 31 and 51 and the air evacuation path 8 between the lenticular lens 20 and the Fresnel lens 30. Because the edges of the screen panel 3 are tightly sealed, and because the air evacuation path 8 between the lenticular lens 20 and the Fresnel lens 30 is formed throughout the whole surfaces of the lens sheets, the evacuation of the air is not prevented throughout the whole surfaces of the lens sheets. Thus, the air can be evacuated throughout the whole surfaces of the lens sheets.

According to Embodiment 2, it becomes possible to reduce the pressure of the contact surfaces of the screen panel 3 to be lower than the atmospheric pressure, and therefore the separation of the contact surfaces of the lens sheets do not occur even when the surrounding condition such as temperature and humidity changes. Therefore, it becomes possible to provide the screen unit capable of maintaining the flatness, and of preventing the degradation of the image quality.

Embodiment 3

Figure 10:
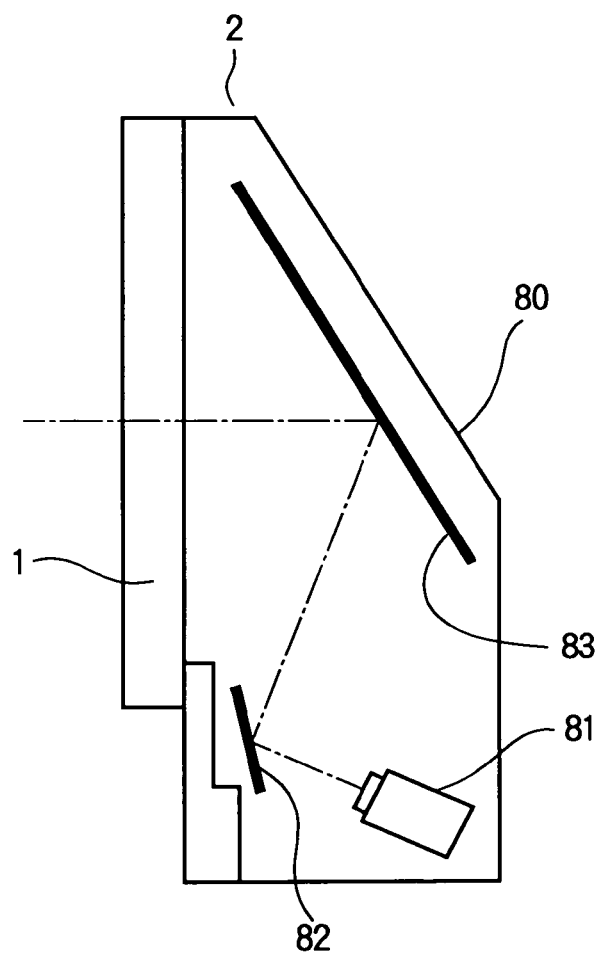
FIG. 10 is a cross sectional view of a projection type display apparatus 2 according to Embodiment 3 of the present invention.

Embodiment 3 relates to a projection type display apparatus 2 on which the above described screen unit 1 of Embodiment 1 or 2 is mounted. FIG. 10 is a side view of the projection type display apparatus 2. The projection type display apparatus 2 includes a cabinet 80 on which the screen unit 1 is mounted. A projection unit 81 and mirrors 82 and 83 are disposed in the cabinet 80. The projection unit 81 projects image light that forms an optical image. The mirror units 82 and 83 reflects the image light to the screen unit 1.

The operation of the screen unit is the same as that of the previous Embodiments.

According to Embodiment 3, it becomes possible to reduce the pressure of the contact surfaces of the screen panel 3 to be lower than the atmospheric pressure, and therefore the separation of the contact surfaces of the lens sheets do not occur even when the surrounding condition such as temperature and humidity changes. Therefore, it becomes possible to provide the projection type display apparatus capable of maintaining the flatness of the screen unit, and capable of preventing the degradation of the image quality.

In the above described Embodiments, the air evacuation path 6 or 8 is formed between the lenticular lens 20 and the Fresnel lens 30. However, it is also possible to form the air evacuation path between the glass plate 10 and the lenticular lens 20.

Further, in the above described Embodiments, the screen panel 3 is made by laminating the glass plate 10, the lenticular lens 20 and the Fresnel lens 30 in this turn. However, it is also possible that the glass plate 10 is sandwiched between the lenticular lens 20 and the Fresnel lens 30. In this case, it becomes unnecessary to attach a film to the glass plate 10 for improving the reflection property and for preventing the damage on the surface through which the image light is emitted, and therefore the manufacturing cost can be reduced.

Additionally, the screen panel 3 can be made by laminating the lenticular lens 20 and the Fresnel lens 30 without using the glass plate 10. In this case, the advantage of improving the resolution is obtained only by the close contact between the lenticular lens 20 and the Fresnel lens 30 because the glass plate 10 is not provided.

Moreover, the vent holes 21, 31 and 51 are not necessarily circular holes, but can be slit-shaped holes. Furthermore, it is possible not to form the vent holes 21, 31 and 51, but to form vent holes on the sealing portion at the edges of the screen panel 3 connecting the air evacuation path 6 or 8 to the outside. In this case, it is possible to obtain the same advantage as when the vent holes 21, 31 and 51 are provided.

Furthermore, instead of continuously operating the evacuating fan 72, it is possible to provide a pressure sensor between the lens sheets, and to operate the evacuating fan 72 when the measured pressure becomes higher than or equals to a predetermined value, or when the difference of the measured pressure from the atmospheric pressure becomes less than or equals to a predetermined value. In this case, the evacuating fan 72 does not continuously operate, and therefore the lifetime of the evacuating fan 72 can be enhanced. Further, the evacuating fan 72 does not generate noise during a period when the evacuating fan 72 does not operate, and therefore the noise can be reduced.

While the preferred embodiments of the present invention have been illustrated in detail, it should be apparent that modifications and improvements may be made to the invention without departing from the spirit and scope of the invention as described in the following claims.

What is claimed is:

1. A screen unit comprising:
   a frame body having an opening for displaying an image;
   a screen panel including a plurality of laminated optically-transmissive plate members, said screen panel being fixed to said frame body so that a light incident on said screen panel is emitted through said opening;
   a sealing portion that seals edges of said screen panel;
   an air evacuation path providing portion that provides an air evacuation path between any of said plurality of plate members;
   a vent hole that leads to said air evacuation path, wherein said vent hole is formed through at least one of said plurality of plate members; and
   an evacuating portion that evacuates the air between said plurality of plate members through said vent hole.

2. The screen unit according to claim 1, wherein said plurality of optically transmissive plate members include at least one rigid plate member.

3. The screen unit according to claim 1, wherein at least one of said plurality of plate members is previously warped in one direction.

4. The screen unit according to claim 1, wherein said vent hole is formed on at least one of said plurality of plate members, and said vent hole is located close to a center portion of said plate member with respect to said sealing portion.

5. The screen unit according to claim 1, further comprising a holding member that holds at least one of said plurality of plate members with respect to said frame body,
   wherein said holding member includes a part capable of stretching and shrinking according to expansion and contraction of said plate member held by said holding member.

6. The screen unit according to claim 5, wherein said holding member has a function to seal at least a part of edges of said screen panel, in addition to a function to hold at least one of said plurality of plate members with respect to said frame body.

7. The screen unit according to claim 1, wherein said plurality of optically transmissive plate members include a glass plate, a lenticular lens, and a Fresnel lens.

8. The screen unit according to claim 1, wherein said air evacuation path providing portion includes a spacer inserted into between said plurality of plate members.

9. The screen unit according to claim 1, wherein said air evacuation path providing portion includes convexes and concaves formed on a contact surface of at least one of said plurality of plate members.

10. A projection type comprising:
    said screen unit according to claim 1, and
    an image projection unit that displays an image on said screen unit,
    wherein said image projection unit includes a light source device that emits image light, and a projection unit that projects said image light on said screen unit to form an optical image thereon.

11. The screen unit according to claim 1, wherein the screen panel includes at least three laminated optically-transmissive plate members and said vent hole is formed through at least two of said plurality of plate members.

* * * * *